United States Patent [19]

Blainey et al.

[11] Patent Number: 5,797,012
[45] Date of Patent: Aug. 18, 1998

[54] CONNECTIVITY BASED PROGRAM PARTITIONING

[75] Inventors: Robert James Blainey, Newmarket; Christopher Michael Donawa; James Lawrence McInnes, both of Toronto, all of Canada

[73] Assignee: International Business Machines Corporation, Armonk, N.Y.

[21] Appl. No.: 727,720

[22] Filed: Oct. 7, 1996

[30] Foreign Application Priority Data

Dec. 28, 1995 [CA] Canada .................................. 2166253

[51] Int. Cl.$^6$ ........................................................ G06F 9/45
[52] U.S. Cl. ..................... 395/705; 395/707; 395/708; 395/709; 395/710; 395/586; 395/704
[58] Field of Search ................................ 395/704, 710, 395/705, 707, 708, 709, 684, 586

[56] References Cited

U.S. PATENT DOCUMENTS

| | | | |
|---|---|---|---|
| 5,107,418 | 4/1992 | Cramer et al. ........................... | 395/700 |
| 5,161,216 | 11/1992 | Reps et al. ................................ | 395/704 |
| 5,193,190 | 3/1993 | Janczync et al. ........................ | 395/707 |
| 5,367,683 | 11/1994 | Brett ......................................... | 395/700 |
| 5,428,793 | 6/1995 | Odnert et al. ............................ | 395/709 |
| 5,485,616 | 1/1996 | Burke et al. .............................. | 395/709 |
| 5,555,417 | 9/1996 | Odnert et al. ............................ | 395/707 |
| 5,579,520 | 11/1996 | Bennett .................................... | 395/704 |

FOREIGN PATENT DOCUMENTS 2102089   10/1993   Canada ............................ G06F 9/44

OTHER PUBLICATIONS

Chow, "Minimizing Register Usage Penalty at Procedure Calls", Proceedings of the SIGPLAN, 'Conf. on Programming Language Design & Implementation, pp. 85–94, Jul. 1988.

Himelstein, et al. "Cross–Module Optimizations: Its Implementation and Benefits", Proceesings of the Summer 87 USENIX Conf., pp. 347–356, Sep. 1987.

Cooper, et al. "The impact of interprocedural analysis & optimization in R.sup.n programming environment" ACM Trans. on Programming Languages & Syst., Oct. 1986.

Crowroft, et al. "Is layering, harmful?" (Remote Procedure Call) IEEE Netw. (USA) vol. 6, No. 1, pp. 20–24, Jan. 1992.

Richardson, et al. "Code Optimization Across Procedures" Computer (USA), vol. 22, No. 2, pp. 42–50, Feb. 1989.

Lomet, "Data flow analysis in the presence of procedure calls" IBM Research & Dev. USA, vol. 21, No. 6, pp. 559–571, Nov. 1977.

K.M. Gilbert, Effective Register Management During Code Generation, IBM Technical Disclosure Bulletin, vol. 15, No. 8, Jan. 1973, pp. 2640–2645.

K. O'Brien et al, Advanced Compiler Technology for the RISC System/6000 Architecture, IBM RISC System/6000 Technology, pp. 154–161, 1990.

Primary Examiner—Edward R. Cosimano
Assistant Examiner—Cuong H. Nguyen
Attorney, Agent, or Firm—Baker Maxham Jester & Meador

[57] ABSTRACT

A method for partitioning programs into multi-procedure modules for efficient compilation. During interprocedural analysis, a weighted callgraph of the program is constructed in which weights on nodes represent code size of each procedure and weights on edges between the nodes represent execution counts between procedures. A coloured interference graph is built from the analysis information, and is used to induce weighted sub-graphs of the callgraph containing no interferences between procedures in each sub-graph. The procedures from a single sub-graph are combined into one or more modules; procedures with the highest weighted edges between them are combined in a module first until the cumulative node weight of the module reaches a preset limit on memory size.

7 Claims, 5 Drawing Sheets

CONNECTIVITY BASED PROGRAM PARTITIONING

BACKGROUND OF THE INVENTION

1. Field of the Invention

The present invention is directed to an improvement in modular software construction to improve the efficiency of memory layout and interprocedural compilation.

2. Description of the Related Art

Interprocedural analysis (IPA) is a 2-pass compilation procedure developed by IBM and used in its XL compilers. IPA is described in detail in Canadian Patent Application No. 2,102,089, commonly assigned. The first IPA pass is performed at compile time and collects summary information that is written to the object file for each procedure compiled. This summary information includes a list of all call sites in each procedure, alias information for each procedure.

The second IPA pass is an information dissemination pass performed at link time when all files in the application have been compiled. The IPA driver reads the summary information from the object files and computes the application's "call-weighted multigraph" or "callgraph", a graph illustrating all of the procedures in the program and the calls between them. A caligraph consists of a number of nodes, each of which represents a procedure in the program. The nodes are interconnected by edges, and each of the edges has a direction. The edge represents procedure or method calls between the nodes or procedures. The information collected from the IPA, or from any of the multiple compilation passes, is used for improving the structure of the code to be produced in the program executables.

General issues involved in memory layout are discussed in our concurrently filed application titled "Improving Memory Layout Based On connectivity Considerations", U.S. Ser. No. 08/726,038, filed on Oct. 10, 1996, which is incorporated herein by reference.

One problem addressed by the present invention is the compilation of very large programs, such as database engines or compilers. It is usually impractical to do so all at once because the entire program cannot all be kept in memory in order compile the program as a single unit.

A second problem addressed by the invention is in respect of inlining procedures, an optimization often performed during compilation. Through inlining, the body of a procedure is substituted for its call in the calling program, thereby improving program execution time. However, merely building a callgraph following IPA does not imply that the routines can necessarily be inlined.

It would not be desirable to inline routines with inconsistent or incompatible options, or with conflicting attributes. Some routines should not be combined for correctness reasons, while the combination of other routines would simply cause the code to perform more slowly.

For example, one procedure including an option to optimize floating point at the expense of accuracy inlined into a procedure that disallowed the compiler from doing this would result in inconsistent attributes. As the inlined code passed through the compiler, a decision would have to be made whether floating point could be optimized or not. In this example, the decision could always be made that floating point cannot be optimized (to avoid conflicts), but the code would be slower because of the lost opportunity for optimization in the inlined routine.

SUMMARY OF THE INVENTION

The present invention is directed to a method for partitioning programs into modules for efficient compilation. The purpose is to pass on through the compiler modular partitions of the program that are of significant size (that is, generally larger than one procedure at a time), without overloading the system constraints on memory size, while minimizing the grouping of conflicting attributes.

U.S. Pat. No. 5,428,793, entitled "Method and Apparatus for Compiling Computer Programs with Interprocedural Register Allocation" of Hewlett Packard Company, describes an optimization technique called "spill code motion" that facilitates the reduction of the overhead associated with saving and restoring so-called "callee-saves" registers. The program analyzer used in connection with a program compiler identifies clusters of nodes in the program callgraph. The basis for determining whether a "cluster" exists is to identify, from profile information collected during a first compiler pass, a unique root node through which every other node in the cluster can be called. Interprocedural machine registers are then assigned to each cluster node, and the root node of each cluster is designated to execute machine instruction to preserve the values of the interprocedural registers assigned to nodes of that cluster, and so that other nodes within the cluster need not execute the machine instructions. In register spill optimization, callee-saves register spill is moved upwards in the callgraph so that descendent nodes may use them without the overhead associated with interprocedural calls. Therefore the motivation for partitioning is on the basis of data sharing.

U.S. Pat. No. 5,161,216, titled "Interprocedural Slicing of Computer Programs Using Dependence Graphs", of Wisconsin Alumni Research Foundation, describes the generation of a system dependence graph that includes a program dependence graph representing the main program, procedure dependence graphs for each of the auxiliary procedures, and additional edges that represent dependencies between a call site and a called procedure and edges that represent transitive dependencies due to calls. The generated system dependence graph is used to carry out interprocedural "slicing", that is, the generation of a slice of the entire program crossing the boundaries of procedure calls to be used for program analysis.

By contrast, the present invention is directed to an optimizing technique invoked following build of the callgraph in interprocedural analysis that uses heuristics based on static analysis or actual execution profile information in order to partition the program into manageable modules. The improvement is in the provision of a method for partitioning a computer program with multiple procedures into compilation modules. The method is run on a data processing system having preset memory size constraints, and consists of the steps of determining frequency of execution calls between pairs of procedures in the program and determining approximate intermediate code size of all of the procedures in the program. The procedures of the program are divided into groups, each group having no interferences between procedures. Each group is subdivided into compilation units by:

i) Dividing a remaining pair of procedures having a highest frequency of execution calls into one compilation unit;

ii) aggregating the instruction size of the procedures in this compilation unit, and iii) repeating steps i) and ii) while the aggregate instruction size in this compilation unit is less than the preset memory size.

The invention is also directed to a program storage device readable by a machine, tangibly embodying a program of instructions executable by the machine for performing the above-described method.

In particular, the invention provides, in a computer system having a size constraint on memory, a method for compiling a computer program into compilation units in a multi-pass compiler capable of generating a call-weighted multigraph having nodes denoting procedures in the computer program, weights on the nodes denoting relative intermediate code size, edges between the nodes representing execution calls and edge weights representing estimated or actual execution call frequency. The method consists of the steps of:

i) sorting the edge weights from highest to lowest;
ii) selecting an edge having a highest edge weight and any node or nodes connecting to said edge remaining for selection;
iii) aggregating the weight of the selected node or nodes;
iv) dividing the edge and the selected node or nodes into compilation unit having an aggregate node weight not exceeding the size constraint on memory when the aggregate weight of the selected node or nodes is added;
v) removing the selected edge and the selected node or nodes from selection; and
vi) repeating steps ii) through v) for all edges.

BRIEF DESCRIPTION OF THE DRAWINGS

Embodiments of the invention will now be described in detail in association with the accompanying drawings in which.

DETAILED DESCRIPTION OF THE PREFERRED EMBODIMENTS

Figure 1:
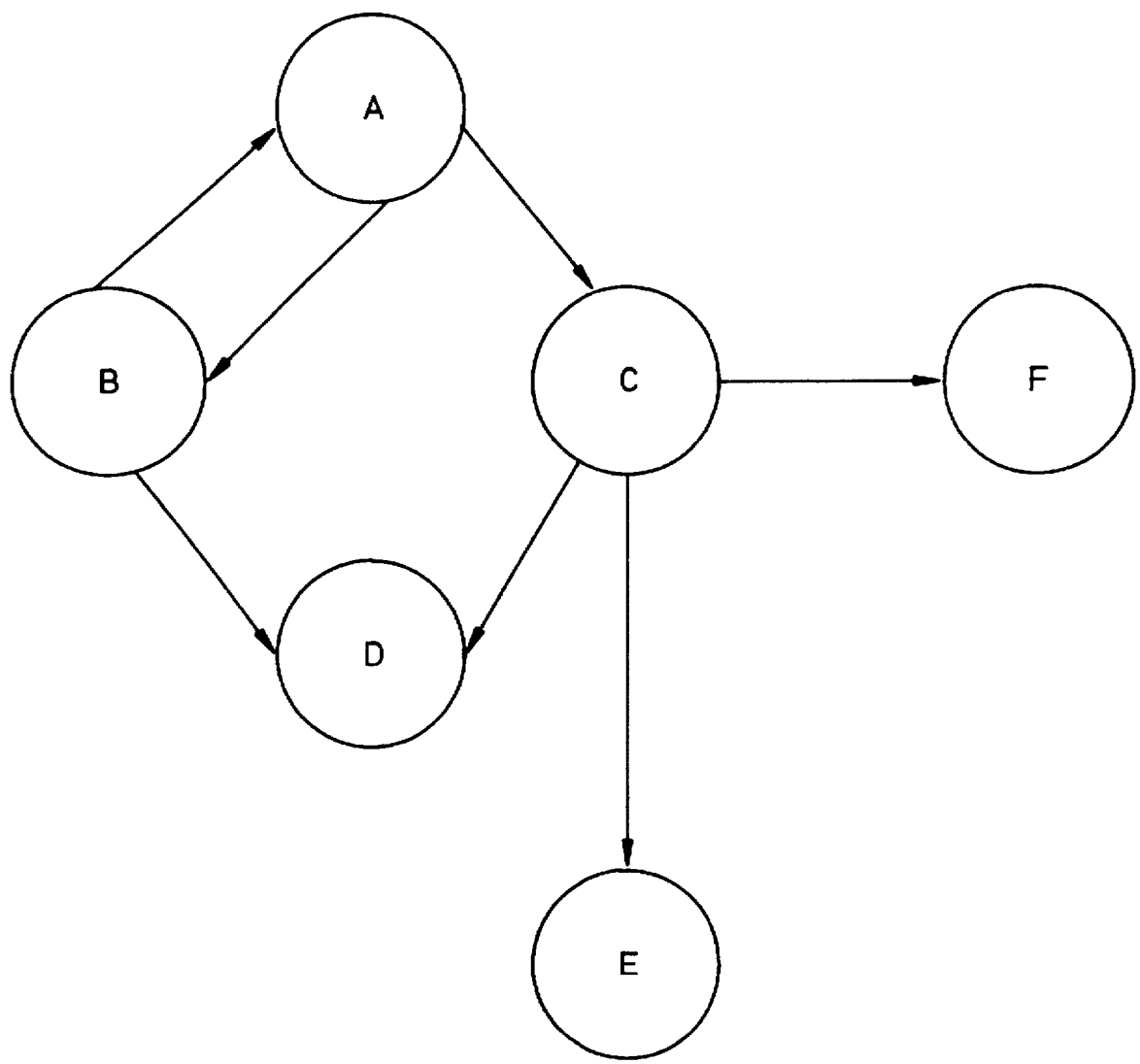
FIG. 1 is a callgraph showing interprocedural calls within a program.
Figure 2:
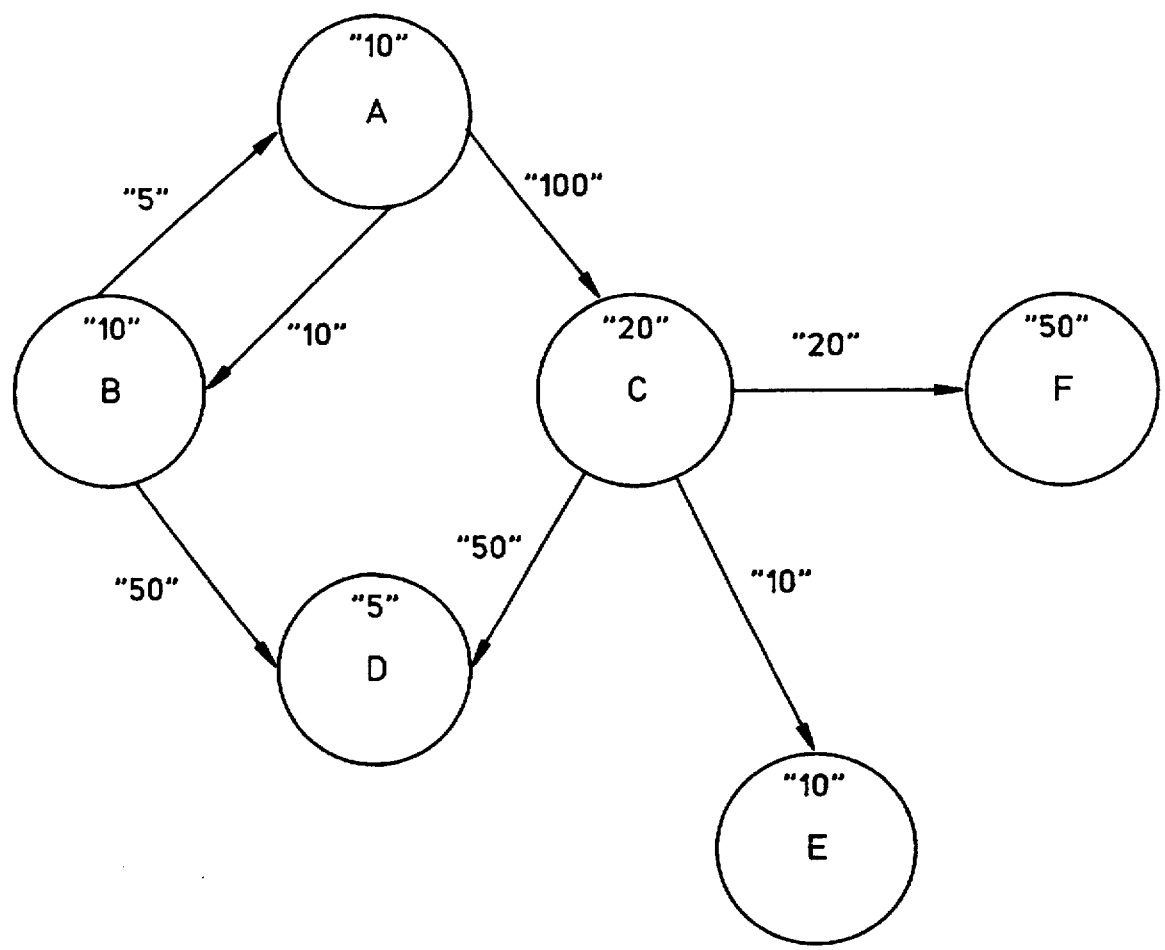
FIG. 2 is the callgraph of FIG. 1 with values representing weights on the edges and nodes of the callgraph.

FIG. 1 shows a simple callgraph constructed from information gathered during interprocedural analysis. This program consists of six procedures. A and B call each other; A also calls C and B also calls D. C calls D, E and F. By applying heuristics (information also gathered during IPA compilation) or actual profile information to the call graph of FIG. 1, the "weightings" of the edges between the procedures can be determined and this is illustrated in FIG. 2. The "weight" of an edge between two procedures could represent the execution count, that is the number of times that one procedure calls another. Under this analysis, procedure A calls B 10 times in this program, while B calls A only five times. By contrast, procedure A calls C 100 times. Alternatively, the weight on the edge could be an estimated weight based on profiling each one of the nodes.

As can be seen from FIG. 2, each node also has a weight associated with it. This can be an estimate based on the sizes (or number of lines) of the code.

Figure 3:
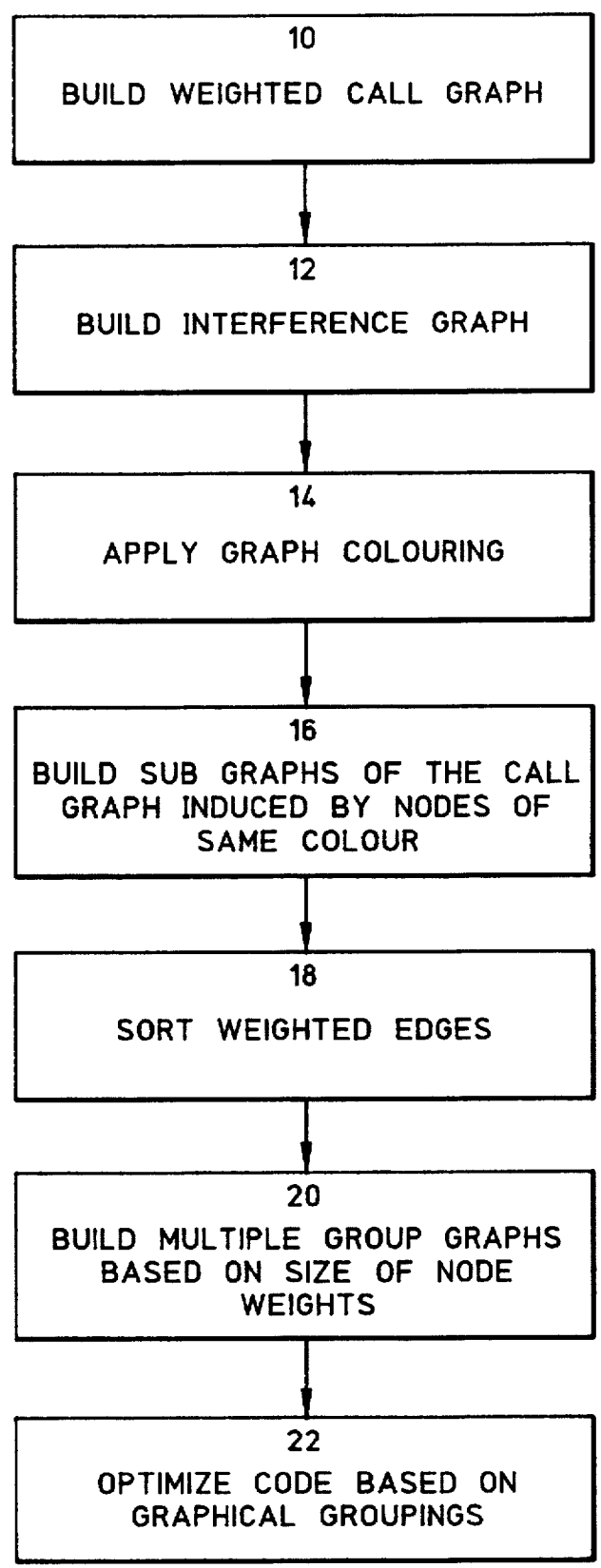
FIG. 3 is a flow diagram showing the steps for program partitioning, according to one aspect of the invention.
Figure 4:
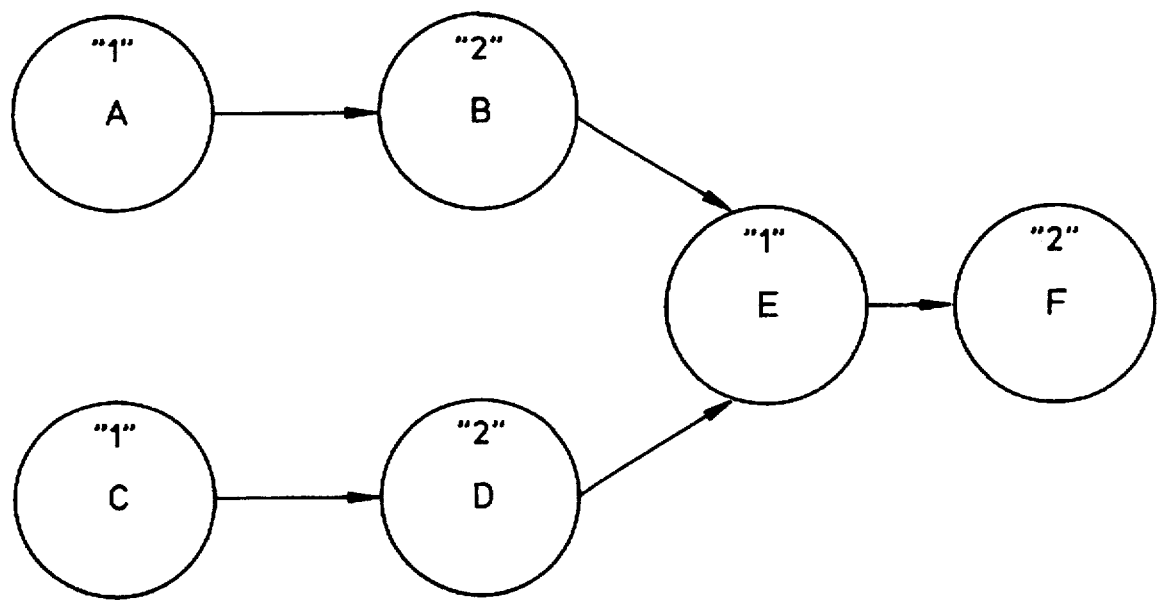
FIG. 4 is a coloured interference graph of the callgraph of FIGS. 1 and 2.

Using the information derived from IPA of the application during compilation, the aspect of the invention directed to instruction locality is illustrated in the flow diagram of FIG. 3 beginning at block 10. The call graph of FIGS. 1 and 2 is built using the information gathered for optimization as described above. From the call graph, each node is extracted and used to build an interference graph (block 12). The edges between the nodes in the interference graph represent conflict between the nodes, and where there are no edges between nodes, there are no conflicts for whatever reasons (eg. options, etc.). An interference graph for the call graph of FIGS. 1 and 2 is illustrated in FIG. 4. "Graph colouring" is applied to the interference graph (block 14). This is a procedure of applying a minimum number of colours (or numbers as shown in FIG. 4) to each of the nodes so that no two nodes joined by an edge have the same colour or number.

Figure 5A:
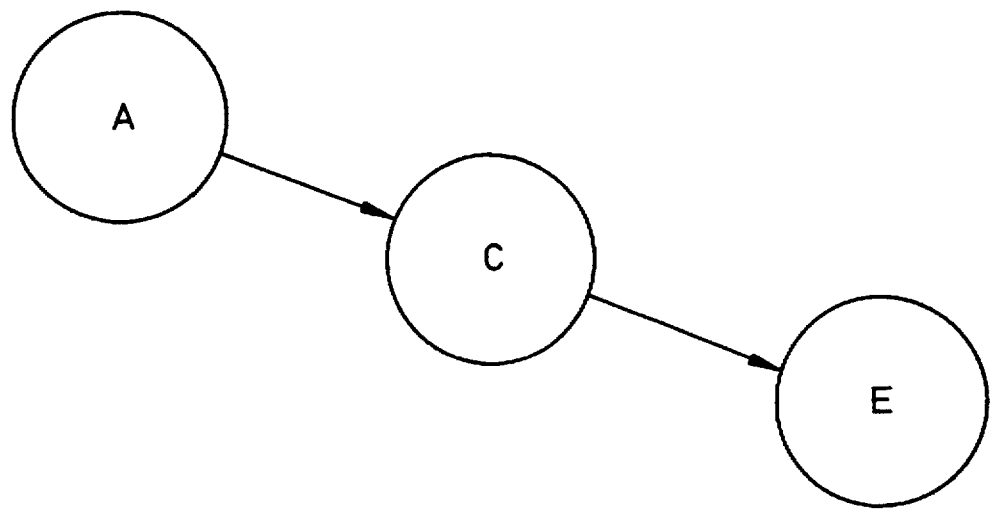
FIG. 5, consisting of FIGS. 5A and 5B, are subgraphs of the callgraphs of FIGS. 1 and 2.
Figure 5B:
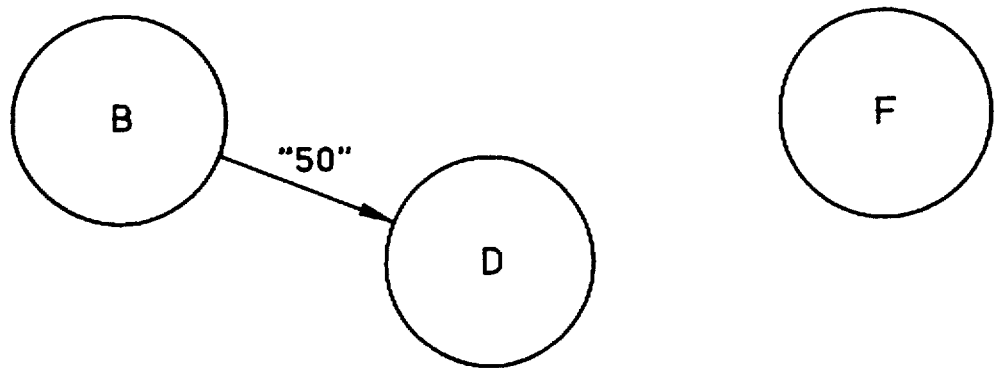

From the coloured interference graph, sub-graphs of the call graph are built induced by nodes of the same colour (block, 16). From the coloured interference graph of FIG. 4, two valid subgraphs are induced, as shown in FIGS. 5A and 5B. In FIG. 5A, the sub-graph consists of procedures A, C and E. In FIG. 5B, the sub-graph consisting of procedures B, D and F shows F as disconnected because in the original call graphs of FIGS. 1 and 2, F is not directly called by either procedure B or D.

The sub-graphs show the grouping of procedures that could be combined into modules. However, in the case of the partitioning aspect of this invention, the purpose is to pass on to the next state of the compilation machine pieces of code that are of significant size, but that are not so large as to exceed machine or user defined limits for that platform. Therefore, this invention provides a further optimization procedure to maximize the size of each grouping passed while remaining within the imposed limits.

In FIG. 2, values called "weights", representing the execution count between procedures, were added to the edges. These weights now come to symbolize the desirability of processing procedures together within partitions, subject to system-dependant or user defined constraints, such as memory size. To appropriately group interacting procedures together, a process is employed that is somewhat derived from the algorithm for computing the maximal spanning forest of a directed graph.

To compute a maximal spanning forest, the edges from a weighted graph are sorted from highest to lowest weight. Spanning trees are created by adding edges to groups, except where the addition of an edge would create a cycle. In a maximal spanning forest, the spanning trees cannot exceed a pre-set size.

In this preferred embodiment of the present invention, the weighted edges from the originally weighted call graph (FIG. 2) are sorted from highest to lowest weight (block 18 in FIG. 3), to yield the following hierarchy:

| | |
|---|---|
| A -> C | (Edge weight = 100) |
| B -> D | (Edge weight = 50) |
| C -> D | (Edge weight = 50) |
| C -> F | (Edge weight = 20) |
| A -> B | (Edge weight = 10) |
| B -> A | (Edge weight = 5) |

Multiple group graphs, based on the pattern of the disjoint sub-graphs (FIGS. 5A and 5B) are built. To avoid violating imposed constraints on module size with any one group, the basis for limiting group size is the sum of the node weight of the procedures to be included in a single partition (block 20 of FIG. 3).

If we assume a system-imposed limit of 40 in the case of the example illustrated in FIGS. 2 and 5, procedure A calling procedure C would be the start of one group graph with a cost of 30. Procedure C calling the group graph includes procedure B and procedure D cannot be added to this group because of the additional node weight of 15 yield a total of 45, exceeding the imposed limit of 40. Similarly, the edge between C calling F cannot be added without again exceeding the limit.

The second major grouping is based on procedure B calling procedure D, with the total node weight of 15. Procedure F will not be added into this sub-group because, as shown in FIG. 5B, it is disjoint. By contrast, the spanning forest algorithm need not be concerned with conflict constraints since it is run only on subgraphs which are guarenteed (by colouring) to be conflict-free.

The result of the use of this optimization technique is that components that call each other a lot are partitioned together. This allows subsequent components to optimize these frequently call edges (eg. register optimization). The heavy edges are optimized and the lighter edges become module entry points and external calls.

The result of partitioning is a set of procedure groups which will be both compiled and optimized together, and be mapped together in memory in the final loaded image of the program. The high connectivity between procedures in a group ensures better use of the instruction memory hierarchy and ensures that interprocedural optimization above on the group is the best possible under the given constraints.

The embodiments of the invention in which an exclusive property or privilege is claimed are defined as follows:

1. A method for partitioning a computer program with multiple procedures into compilation modules on a data processing system having defined constraints, comprising the computer-executed steps of:

defining a constraint;

determining frequency of execution class as between pairs of all of the procedures in the program;

determining instruction size of all of the procedures in the program;

dividing the procedures of the program into at least one group, each group having no interferences between procedures; and subdividing each group into compilation units by:
  i) dividing a remaining pair of procedures having a highest frequency of execution calls into one compilation unit,
  ii) aggregating the instruction size of the procedures in the one compilation unit, and
  iii) repeating steps i) and ii) while the aggregate instruction size in the one compilation unit is less than the defined constraint.

2. A method, according to claim 1, wherein the steps of determining frequency of execution calls and determining instruction size comprise constructing a call-weighted multigraph.

3. A method, according to claim 1, wherein the steps of dividing the procedures of the program into at least one group comprises constructing an interference graph.

4. A program storage device readable by a machine in a data processing system having preset memory size constraints, tangibly embodying a program of instructions executable by the machine to perform method steps for partitioning a computer program with multiple procedures into compilation modules, said method steps comprising:

i) dividing a remaining pair of procedures having a highest frequency of execution calls into one compilation unit, ii) aggregating the instruction size of the procedures in the one compilation unit, and iii) repeating steps i) and ii) while the aggregate instruction size in the one compilation unit is less than the preset memory size.

5. In a computer system having a constraint defined by the computer system or by the user, a method for compiling a computer program into compilation units in a multi-pass compiler capable of generating a call-weighted multigraph having nodes denoting procedures in the computer program, weights on the nodes denoting relative instruction size, edges between the nodes representing execution calls and edge weights representing execution call frequency, the method comprising the computer-executed steps of:

i) defining a constraint;

ii) sorting the edge weights into a highest to lowest sorted list;

iii) selecting an edge having a highest edge weight and any node or nodes connecting to said edge remaining for selection;

iv) aggregating the weight of the selected node or nodes;

v) dividing the edge and the selected node or nodes into compilation unit having an aggregate node weight not exceeding the constraint when the aggregate weight of the selected node or nodes is added;

vi) removing the selected edge from the sorted list; and vii) repeating steps iii) through via for all edges.

6. A method according to claim 5, further comprising the step of sorting the nodes by interference prior to dividing any selected nodes into a compilation unit, whereby to divide nodes into compilation units without interferences.

7. A program storage device readable by a machine in a data processing system having preset memory size constraints, tangibly embodying a program of instructions executable by the machine to perform method steps for partitioning a computer program with multiple procedures into compilation modules, said method steps comprising:

i) defining a graph with nodes, edges, and edge weights, each node representing a respective procedure of said multiple procedures, each edge connecting two respective nodes and representing a call between the two respective nodes, each edge weight representing an execution count between two respective procedures;

ii) sorting the edge weights into a highest to lowest sorted list;

iii) selecting an edge having a highest edge weight and any node or nodes connecting to said edge remaining for selection;

vi) aggregating the weight of the selected node or nodes;

v) dividing the edge and the selected node or nodes into compilation unit having an aggregate node weight not exceeding the size constraint on memory when the aggregate weight of the selected node or nodes is added;

vi) removing the selected edge from the sorted list; and vii) repeating steps iii) through vi) for all edges.

* * * * *

UNITED STATES PATENT AND TRADEMARK OFFICE
CERTIFICATE OF CORRECTION

PATENT NO. : 5,797,012
DATED : August 18, 1998
INVENTOR(S) : Blainey et al

It is certified that error appears in the above-indentified patent and that said Letters Patent is hereby corrected as shown below:

Column 4, line 65, change "includes" to --including--.

Signed and Sealed this

First Day of December, 1998

*Attest:*

BRUCE LEHMAN

*Attesting Officer*  *Commissioner of Patents and Trademarks*